United States Patent

Beaton et al.

[15] 3,679,715
[45] July 25, 1972

[54] PROCESS FOR THE SELECTIVE REDUCTION OF 6-METHYLENE-3-KETO-$\Delta^4$-STEROIDS

[72] Inventors: John M. Beaton; Verlan H. Van Rheenen, both of Portage; Jekishan R. Parikh, Kalamazoo, all of Mich.

[73] Assignee: The Upjohn Company, Kalamazoo, Mich.

[22] Filed: Oct. 16, 1970

[21] Appl. No.: 81,544

[52] U.S. Cl. ............... 260/397.1, 260/397.4, 260/239.55 A, 260/397.3, 260/397.45
[51] Int. Cl. ..................................................... C07c 169/36

[56] References Cited

UNITED STATES PATENTS 3,328,433  6/1967  Cooley et al. ........................ 260/397.4
3,389,154  6/1968  Burn et al. ........................... 260/397.45
3,523,943  8/1970  Reerink et al. ...................... 260/239.55

Primary Examiner—Elbert L. Roberts
Attorney—John Kekich and Ward F. Nixon

[57] ABSTRACT

A novel process for the selective reduction of 6-methylene-3-keto-$\Delta^4$-steroids with a palladium catalyst to obtain the corresponding 6-methyl-3-keto-$\Delta^5$-steroid which is isomerized in the presence of an acid or a base to obtain the desired 6$\alpha$-methyl-3-keto-$\Delta^4$-steroid.

An important characteristic of many pharmacologically active steroids is the presence of a methyl substituent at the 6$\alpha$-position. The process of this invention provides a useful method for obtaining these novel compounds.

14 Claims, No Drawings

PROCESS FOR THE SELECTIVE REDUCTION OF 6-METHYLENE-3-KETO-Δ -STEROIDS

BACKGROUND OF THE INVENTION

The direct catalytic hydrogenation of 6-methylene-3-keto-Δ⁴-steroids to obtain the corresponding 6α-methyl-3-keto-Δ⁴-steroid in high yield has hitherto been impractical. Burn et al. Tetrahydron 21, 1619 (1965) report that experiments on catalytic reduction of 6-methylen-4-en-3-ones were unpromising. Burns et al. report that in spite of variations in catalyst, solvent and additives (e.g., pyridine), the reduction was not selective for the 6-methylene group and the products were mixtures containing considerable amounts of saturated 3-ketones. Burn et al. supra. and Burn et al. Chemistry and Industry 1907 (1962) show that good yields of the desired 6α-methyl-3-keto-Δ⁴-steroid from corresponding 6-methylene-3-keto-Δ⁴-steroid can only be obtained by subjecting the 6-methylene starting compound to transfer hydrogenation to obtain the 6α-methyl-3-keto-Δ⁴-steroid as the major product together with the isomeric 6β-methyl-3-keto-Δ⁴-steroid which is isomerized to the desired 6α-isomer prior to recovery in accordance with the method of Ackroyd et al., J. Chem. Soc., 4099 (1957).

Godtfredsen et al., U. S. Pat. No. 2,996,523, disclose the direct catalytic hydrogenation of 3-keto-Δ⁴-6-dihalomethylene steroid followed by acid treatment to obtain the corresponding 3-keto-Δ⁴-6α-methyl steroid.

BRIEF SUMMARY OF THE INVENTION

Heretofore, as shown in the above mentioned prior art, it has not been possible to convert 6-methylene-3-keto-Δ⁴-steroids to the corresponding 6α-methyl steroids in commercially feasible amounts by direct catalytic hydrogenation; i.e., using molecular hydrogen. It has now been discovered that 6-methylene-3-keto-Δ⁴-steroids can be hydrogenated directly using a palladium catalyst and molecular hydrogen to obtain the corresponding 6-methyl-3-keto-Δ⁵-steroid which is isomerized in the presence of an acid or a base to give the corresponding 6α-methyl-3-keto-Δ⁴-steroid in high yield.

Steroids containing a 6α-methyl function are known and valuable therapeutic agents. The novel process of this invention provides an excellent method for obtaining these useful compounds and as intermediates which can be converted thereto in accordance with known methods. Examples of useful steroids which can be prepared by the process of this invention are:

6α-methylcortisone;
6α-methylhydrocortisone;
6α-methylprednisolone (Medrol);
16-methylene-17α-hydroxy-6-methyl-4,6-pregnadiene-3,20-dione acetate (Melegesterol Acetate);
6α-methyl-17α-hydroxyprogesterone acetate (Provera);
6α-methyl-17α-hydroxyprogesterone;
methyl 6α-methyl-3,11-dioxo-4,17(20)-pregnadiene-21-oate;
6α-methyltestosterone; and numerous others well known in the art.

DETAILED DESCRIPTION OF THE INVENTION

The process of this invention is generally applicable to any 6-methylene-3-keto-Δ⁴-steroid and is illustratively represented by the following flow diagram of partial structural formulae:

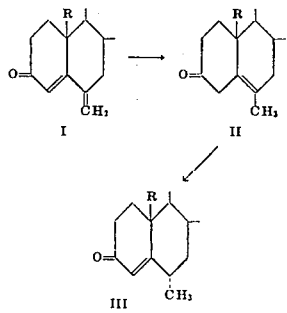

wherein R is hydrogen or methyl.

In carrying out the process of this invention (outlined above) a 6-methylene-3-keto-Δ⁴-steroid (I) is hydrogenated with molecular hydrogen in the presence of a palladium catalyst to obtain the corresponding 6-methyl-3-keto-Δ⁵-steroid (II). The Δ⁵-compound (II) thus obtained is then subjected to isomerization in the presence of an acid or base to obtain the corresponding 6α-methyl-3-keto-Δ⁴-steroid (III).

The conversion of I to II is carried out under known catalytic hydrogenation methods using molecular hydrogen in the presence of a palladium catalyst. Suitable catalysts include palladium on strontium carbonate, palladium on calcium carbonate, palladium on barium carbonate, palladium on activated carbon (e.g., charcoal), etc. In the present process 5 percent palladium on charcoal is preferred. The presence of diaza [2.2.2] bicyclooctane in the reaction mixture is desirable. It reduces the amount of over reduction and results in appreciably greater yields (about 10 percent) of the desired 6-methyl-Δ⁵-product. Alternatively the selected palladium catalyst can be pretreated with diaza [2.2.2] bicyclooctane in which case the diaza [2.2.2] bicyclooctane need not be added to the hydrogenation reaction mixture. The hydrogenation can be carried out at any convenient pressure and at any temperature which is compatable with the reaction medium, starting material and product. A temperature within the range of about 0° C. to about 40° C. is generally convenient. Solvents which can be used include for example, acetone; lower alcohols such as methanol, ethanol, propanol, isopropanol, N-butanol and the like; ethylene glycol monomethyl ether, etc. Ethylene glycol monomethyl ether is preferred.

The isomerization of II to II is carried out in the presence of an acid or a base. Bases which can be used are sodium hydroxide, potassium hydroxide, sodium carbonate, sodium methoxide and the like. Acids which can be used are strong acids, that is an acid which in aqueous solution is completely dissociated into hydrogen ions and anions. Hydrochloric acid is preferred. The isomerization is advantageously conducted under a nitrogen or other inert atmosphere; an ambient temperature is advantageous although higher or lower temperatures can be used without determental effect. A temperature range of from about 0° C. to about 50° C. is preferred.

EXAMPLE 1

6α-methyl-17α-acetoxy-4-pregnene-3,20-dione.

6-methylene-17α-acetoxy-4-pregnene-3,20-dione [3.5 g. (0.0091 mole)], 240 ml. of ethylene glycol monomethyl ether (hereinafter referred to as methyl cellosolve) containing 1.21 g. of diaza [2.2.2] bicyclooctane (hereinafter referred to as Dabco) is hydrogenated over 0.41 g. of 5 percent palladium-on-charcoal to obtain 6-methyl-17α-acetoxy-5-pregnene-3,20-dione. When a little more than the theoretical amount of hydrogen is taken up, the reaction mixture is filtered under a nitrogen atmosphere. The filtrate thus obtained is treated with 17.7 ml. of concentrated hydrochloric acid and stirred at room temperature (about 25° C.) for about one-half hour. The filtrate is then diluted by the slow addition of about 1500 ml. of deionized water. The precipitate thus obtained is collected on a filter, washed with water to neutral pH and dried to give 3.32 g. (95 percent yield) of 6α-methyl-17α-acetoxy-4-pregnene-3,20-dione. Thin layer chromatography (TLC), vapor phase chromatography (VPC) and nuclear magnetic resonance (NMR) show the product to be identical to a known sample of 6α-methyl-17α-acetoxy-4-pregnene-3,20-dione.

EXAMPLE 2

6α-methyl-17α-hydroxy-4-pregnene-3,20-dione.

A mixture of 0.41 g. of 5 percent palladium-on-charcoal, 1.21 g. of Dabco and 30 ml. of methyl cellosolve is digested by stirring under a nitrogen atmosphere at room temperature for about 15 minutes. A mixture of 13.4 g. of 6-methylene-17α-hydroxy-4-pregnene-3,20-dione and 210 ml. of 2 percent aqueous methyl cellosolve is then added and the mixture is hydrogenated with agitation at 5 p.s.i.g. at 15° C. until slightly more than the theoretical amount of hydrogen has been taken up. The reaction mixture is then purged with nitrogen and filtered through a diatomaceous earth filter cake under an atmosphere of nitrogen. The filter cake is then washed with nitrogen-sparged cellosolve and the wash is added to the filtrate. The combined filtrate and wash containing 6-methyl-17α-hydroxy-5-pregnene-3,20-dione is then treated slowly with 25 ml. of concentrated hydrochloric acid and stirred for about one-half hour at about room temperature. The acid solution is then diluted by the slow addition of about 1500 ml. of deionized water while cooling in a cold water bath. After the addition of the water is completed the mixture is cooled with stirring for one hour at about 13° to 15° C.

The precipitate thus obtained is collected on a filter, washed with deionized water to a neutral pH and dried in a vacuum oven at about 60° C. to give 11.99 g. (95.6 percent yield) of 6α-methyl-17α-hydroxy-4-pregnene-3,20-dione, m.p. 194.5°–208° C.; $[\alpha]^{25°} +72°$, $\lambda_{max.}^{EtOH}$ 241 m$\mu$ ($\epsilon$ = 15,215).

EXAMPLE 3

Methyl 6α-methyl-3,11-diketo-4,17(20)-pregnadien-21-oate.

A mixture of 0.20 g. of 5 percent palladium-on-charcoal, 1.2 g. of Dabco and 30 ml. of methylcellosolve is digested by stirring under nitrogen at room temperature for about 15 minutes. A mixture of 13.4 g. of methyl 6-methylene-3,11-diketo-4,17(20)-pregnadien-21-oate and 210 ml. of 2 percent aqueous methyl cellosolve is then added and the mixture is hydrogenated at 5 p.s.i.g. with agitation at 15° C. When 1.02 moles of hydrogen has been consumed in about 130 minutes, the hydrogen is replaced by nitrogen and the mixture is filtered under nitrogen through a filter aid to remove the palladium catalyst. The cake is washed with 50 ml. of methyl cellosolve and the filtrate and wash are combined. The combined filtrate and wash containing methyl 6-methyl-3,11-diketo-5,17(20)-pregnadien-21-oate is treated with 25 ml. of concentrated hydrochloric acid while maintaining the temperature at about 15° C. The mixture is stirred for about 30 minutes and then one liter of 0.2 M sodium carbonate solution is added slowly keeping the temperature at about 15° C. The mixture is then allowed to stand for about 20 minutes and the precipitate thus obtained is collected on a filter, washed thoroughly with water to remove inorganic salts and dried to give 12.9 g. (95.7 percent yield) of methyl 6α-methyl-3,11-diketo-4,17(20)-pregnadien-21-oate, m.p. 188°–196° C.; $[\alpha]_D$ + 150°; $\lambda_{max.}^{EtOH}$ 232 m$\lambda$ ($\epsilon$ = 22,650); NMR analysis supports the assigned structure.

EXAMPLE 4

Methyl 6α-methyl-3,11-diketo-1,4,17(20)-pregnatrien-21-oate.

Following the procedure of Example 3, methyl 6-methylene-3,11-diketo-1,4,17(20)-pregnatrien-21-oate is hydrogenated to give methyl 6-methyl-3,11-diketo-1,5,17(20)-pregnatrien-21-oate, which is isomerized to obtain methyl 6α-methyl-3,11-diketo-1,4,17(20)-pregnatrien-21-oate.

EXAMPLE 5

6α-methyl-4-pregnene-3,11,20-trione.

Following the procedure of Example 1, 6-methylene-4-pregnene-3,11,20-trione is hydrogenated to give 6-methyl-5-pregnene-3,11,20-trione, which is isomerized to obtain 6α-methyl-4-pregnene-3,11,20-trione.

EXAMPLE 6

6α-methyl-25D-spirost-4-en-3-one.

Following the procedure of Example 1, 6-methylene-25D-spirost-4-en-3-one is hydrogenated to obtain 6-methyl-25D-spirost-5-en-3-one, which is isomerized to obtain 6α-methyl-25D-spirost-4-en-3-one.

EXAMPLE 7

6α-methyl-21-fluoro-17α-hydroxy-4-pregnene-3,20-dione 17-acetate.

Following the procedure of Example 1, 6-methylene-21-fluoro-17α-hydroxy-4-pregnene-3,20-dione 17-acetate is hydrogenated to give 6-methyl-21-fluoro-17α-hydroxy-5-pregnene-3,20-dione 17-acetate, which is isomerized to obtain 6α-methyl-21-fluoro-17α-hydroxy-4-pregnene-3,20-dione 17-acetate.

EXAMPLE 8

6α-methyl-4-androstene-3,17-dione.

Following the procedure of Example 1, 6-methylen-4-androstene-3,17-dione is hydrogenated to give 6-methyl-5-androstene-3,17-dione, which is isomerized to obtain 6α-methyl-4-androstene-3,17-dione.

EXAMPLE 9

6α-methyl-17α,21-dihydroxy-4-pregnene-3,11,20-trione 21-acetate.

Following the procedure of Example 1, 6-methylene-17α,21-dihydroxy-4-pregnene-3,11,20-trione 21-acetate is hydrogenated to give 6-methyl-17α,21-dihydroxy-5-pregnene-3,11,20-trione 21-acetate, which is isomerized to obtain 6α-methyl-17α,21-dihydroxy-4-pregnene-3,11,20-tione 21-acetate.

We claim

1. The process which comprises hydrogenating a 6-methylene-3-keto-Δ$^4$-steroid with molecular hydrogen in the presence of a palladium catalyst to obtain the corresponding 6-methyl-3-keto-Δ$^5$-steroid, wherein the hydrogenation is carried out in the presence of diaza [2.2.2]bicyclooctane.

2. The process of claim 1, wherein the palladium catalyst is in the form of palladium-on-charcoal.

3. The process which comprises hydrogenating a 6-methylene-3-keto-Δ$^4$-steroid with molecular hydrogen in the presence of a palladium catalyst to give the corresponding 6-methyl-3-oxo-Δ$^5$-steroid and isomerizing the Δ$^5$-steroid so obtained with an acid or a base to obtain the corresponding 6α-methyl-3-keto-Δ$^4$-steroid.

4. The process of claim 3, wherein the palladium catalyst is palladium-on-charcoal.

5. The process of claim 3, wherein the hydrogenation is carried out in the presence of diaza [2.2.2] bicyclooctane.

6. The process of claim 3, wherein the catalyst is palladium-on-charcoal pretreated with diaza [2.2.2] bicyclooctane.

7. The process of claim 4, wherein the isomerization is carried out in the presence of a strong acid.

8. The process which comprises: hydrogenating a 6-methylene-3-keto-Δ$^4$-steroid in a solvent in the presence of diaza [2.2.2] bicyclooctane and a palladium-on-carbon catalyst to give the corresponding 6-methyl-3-keto-Δ$^5$-steroid and isomerizing the Δ$^5$-steroid so obtained with a strong acid to obtain the corresponding 6α-methyl-3-keto-Δ$^4$-steroid.

9. The process of claim 8, wherein the solvent is ethylene glycol monomethyl ether.

10. The process of claim 8, wherein the the catalyst is 5 percent palladium-on-charcoal.

11. The process of claim 8, wherein the strong acid is hydrochloric acid.

12. The process of claim 8, wherein 6-methylene-17α-acetoxy-4-pregnene-3,20-dione is hydrogenated to give 6-methyl-17α-acetoxy-5-pregnene-3,20-dione, which is isomerized to obtain 6α-methyl-17α-acetoxy-4-pregnene-3,20-dione.

13. The process of claim 8, wherein 6-methylene-17α-hydroxy-4-pregnene-3,20-dione is hydrogenated to give 6-methyl-17α-hydroxy-5-pregnene-3,20-dione which is isomerized to obtain 6α-methyl-17α-hydroxy-4-pregnene-3,20-dione.

14. The process of claim 8, wherein methyl 6-methylene-3,11-diketo-4,17(20)-pregnadien-21-oate is hydrogenated to give methyl 6-methyl-3,11-diketo-5,17(20)-pregnadien-21-oate, which is isomerized to obtain methyl 6α-methyl-3,11-diketo-4,17(20)-pregnadien-21-oate.

* * * * *